United States Patent [19]

Cohen

[11] Patent Number: 5,751,614
[45] Date of Patent: May 12, 1998

[54] SIGN-EXTENSION MERGE/MASK, ROTATE/ SHIFT, AND BOOLEAN OPERATIONS EXECUTED IN A VECTORED MUX ON AN ALU

[75] Inventor: Earl T. Cohen, Fremont, Calif.

[73] Assignee: Exponential Technology, Inc., San Jose, Calif.

[21] Appl. No.: 609,908

[22] Filed: Feb. 29, 1996

Related U.S. Application Data

[63] Continuation-in-part of Ser. No. 444,814, May 18, 1995, Pat. No. 5,497,341, which is a continuation of Ser. No. 207,751, Mar. 8, 1994, Pat. No. 5,442,577.

[51] Int. Cl.$^6$ ............................................. G06F 7/38
[52] U.S. Cl. ............................ 364/716.02; 364/736.01
[58] Field of Search ........................... 364/716.01, 716.02, 364/736.01

[56] References Cited

U.S. PATENT DOCUMENTS

| | | | |
|---|---|---|---|
| 3,764,988 | 10/1973 | Onishi | 340/172.5 |
| 4,608,660 | 8/1986 | Hasebe | 364/768 |
| 4,992,934 | 2/1991 | Portanova et al. | 364/200 |
| 5,327,543 | 7/1994 | Miura et al. | 364/736.01 |
| 5,442,576 | 8/1995 | Gergen et al. | 364/715.08 |
| 5,651,121 | 7/1997 | Davies | 364/736.01 |

Primary Examiner—Jan V. Mai
Attorney, Agent, or Firm—Stuart T. Auvinen

[57] ABSTRACT

A processor has an execution unit that includes an arithmetic-logic-unit (ALU). Logic instructions are executed by a Boolean logic unit constructed around a 4:1 vectored mux. For Boolean logic instructions, the two operands are applied to the select control inputs of the vectored mux, while truth-table signals representing a truth-table for the Boolean operation being executed are applied to the data inputs of the vectored mux. Sign-extension of one of the operands can be performed by modifying the truth-table signals for an upper portion where the sign-extension occurs. Merge instructions are also executed on the vectored mux by reversing the connection of the operands to the vectored mux. The operands are applied to the select control inputs of the vectored mux for Boolean operations, but applied to the data inputs for merge operations. A mask is generated and applied to the select control inputs to select the correct portions of the first and second operands to generate the result of the merge operation. A shifter or rotator is used to shift/rotate an operand before being applied to the data input of the mux so that compound rotate-merge operations can be executed in a single step through the vectored mux. Merge, mask, rotate, shift, and Boolean operations are all performed by the vectored mux.

18 Claims, 4 Drawing Sheets

SIGN-EXTENSION MERGE/MASK, ROTATE/SHIFT, AND BOOLEAN OPERATIONS EXECUTED IN A VECTORED MUX ON AN ALU

BACKGROUND OF THE INVENTION—RELATED APPLICATIONS

This application is a continuation-in-part (CIP) of U.S. Ser. No. 08/444,814, filed May 18, 1995 now U.S. Pat. No. 5,497,341, which is a continuation of Ser. No. 207,751 filed Mar. 8, 1994 U.S. Pat. No. 5,442,577, hereby incorporated by reference.

BACKGROUND OF THE INVENTION—FIELD OF THE INVENTION

This invention relates to digital arithmetic units, and more particularly to methods for sign-extension, masking, and merging operations.

BACKGROUND OF THE INVENTION—DESCRIPTION OF THE RELATED ART

The parent, U.S. Pat. No. 5,442,577, disclosed a vectored mux for performing Boolean operations and sign-extension of an operand or immediate constant. The vectored mux performs both the Boolean operation and the sign-extension simultaneously as one atomic operation.

Both a Boolean operation, such as AND, XOR, AND-OR, and a sign-extension of one operand can be performed as an atomic operation using the vectored mux. The vectored mux is a bank of 32 ordinary four-to-one muxes (for 32-bit operands). Each individual mux generates one bit of the output. The two operands are routed to the two select or control inputs of the vectored mux rather than to the four data inputs. The two select inputs determine which one of the four data inputs is connected to the output.

The four data inputs of the vectored mux are not connected to the operands. Instead, signals representing a truth table for the Boolean operation are applied to these data inputs. The logical values of each bit on the two operands selects the proper entry of the truth table, which is output for that bit-position. Of course, these signals are electrical voltages which represent logical values such as ones and zeros as is well-known in the art.

This unusual connection of the operands to the select inputs of the vectored mux allows many kinds of Boolean operations to be performed on the input operands. For a simple AND operation, the output is high when both input operands are high for a particular bit-position. Thus truth-table signals of 0001 are applied to data inputs D0, D1, D2, D3 respectively for each 4:1 mux. When a particular bit-position has both operands high, then the "1" input to data input D3 is selected as the output for that bit-position.

Another advantage of the vectored mux is that different operations can be applied to different bit-positions for the 32-bit result. An AND operation can be applied to the lowest 8 bits, while a sign-extend operation is applied to the upper 24 bits. The sign-extend operation applied to the upper 24-bits can be a sign-extend of an 8-bit first operand combined with an AND-operation with the second operand.

Simply by changing the truth-table applied to the data inputs, any arbitrary logical function can be performed by the vectored mux. By varying the truth-table inputs for different bit-positions in the vectored mux, different operations can be performed on different parts of an input operand. Thus the vectored mux is versatile yet simple in construction.

A processor can use the vectored mux as a Boolean Logic Unit (BLU) in an arithmetic-logic-unit (ALU) or an integer execute unit. Arithmetic operations such as ADD's and increments are executed in an adder in the ALU while multiply and divide operations can be performed in an integer multiplier also in the ALU. Boolean operations such as AND's, OR's, and complements can be performed by the vectored mux. Sign-extensions can also be performed by the vectored mux along with a Boolean operation as a single-step atomic operation.

Other kinds of operations, including merges and shifts, are common in RISC architectures such as the PowerPC™ architecture. A merge operation merges or inserts a portion of one operand into another operand. A shift operation shuffles all bits to the left or right by a certain number of bit-positions, while a rotate is a shift where the shift-out from the uppermost bit-position is rotated back and input to the lowest bit-position (or vice-versa for a right-rotate). Rotate or shift operations are often combined with merge operations for rotate-merge instructions. These rotate, shift, mask, and merge operations must also be executed by the ALU. Often dedicated hardware is used for rotates and merges, such as a separate merge unit.

What is desired is to extend the vectored mux to perform mask and merge operations as well as Boolean operations. It is desired to construct a Boolean-Logic unit based on the vectored mux and an operand rotator. It is desired that this Boolean-logic unit perform Boolean operations as well as compound mask/merge operations with rotate/shift. A simple apparatus is desired which can perform sign-extension without a Boolean operation.

SUMMARY OF THE INVENTION

A logic-instruction execution unit executes Boolean operations and merge operations.

The logic-instruction execution unit has a vectored mux which outputs a result of a Boolean operation or a merge operation. The vectored mux has a plurality of individual mux cells, with each mux cell having data inputs and select control inputs and an output driving one bit-position of the result. The select control input controls which data input is coupled to drive the output independently of other data inputs.

A first operand input has a plurality of electrical signals represents a first operand while a second operand input has a plurality of electrical signals represents a second operand. Boolean control means is for applying the first operand input and the second operand input to the select control inputs of the vectored mux when a Boolean operation is executed.

Truth-table inputs are electrical signals that represents a truth table for the Boolean operation. The truth-table inputs vary for different Boolean operations. The Boolean control means applies the truth-table inputs to the data inputs of the vectored mux when a Boolean operation is executed. A merge control means applies the first operand inputs to a first data input on the vectored mux and applies the second operand inputs to a second data input on the vectored mux when a merge operation is executed.

A mask generator generates a mask indicating a first portion of the result from the first operand and a second portion of the result from the second operand. The first portion and the second portion do not overlap. The merge control means applies the mask to a select control input of the vectored mux when a merge operation is executed.

The mask causes the vectored mux to select the first portion of the first operand applied to the first data input. The mask also causes the vectored mux to select the second portion of the second operand applied to the second data input.

Thus the vectored mux executes both merge operations and Boolean operations. The operands are applied to the data inputs for merge operations but are applied to the select control inputs for Boolean operations.

In further aspects the invention also executes mask operations. The logic-instruction execution unit also has zeroing means for forcing the second operand to signals that represent all zeros when a mask operation is executed. The merge control means applies the second operand as all zeros to the second data input, but it applies the first operand to the first data input and the mask to the select control input when a mask operation is executed.

The second portion of the result has all zeros but the first portion is the first portion from the first operand when a mask operation is executed. Thus mask, merge, and Boolean operations are all executed by the vectored mux.

In still further aspects the mask generator receives mask limits. The mask limits determine an extent of the first and second portions in the result. The vectored mux has individual four-to-one mux cells, each having four data inputs and two select control inputs.

The merge control means also applies a constant electrical signal to one of the select control inputs when a mask or a merge operation is executed. The constant electrical signal prevents two of the four data inputs from being selected while allowing only the first and the second data inputs to be selected for mask and merge operations. Thus the vectored mux uses four data inputs for Boolean operations of two operands but only two data inputs for mask and merge operations.

In other aspects of the invention a rotate means receives the first operand input and rotates the first operand by a shift-count number of bit-positions. It outputs a rotated first operand to the first data input of the vectored mux when a rotate operation is executed. The merge control means applies the mask having a constant value when a simple rotate operation is executed. The constant value causes the rotated first operand to be selected to drive the output of the vectored mux as the result. Thus rotate operations are also performed by the logic-instruction execution unit and rotated results are passed through the vectored mux.

In still further aspects shift operations are also executed as a type of rotate operation using the rotate means and the vectored mux.

DETAILED DESCRIPTION

The present invention relates to an improvement in digital operations. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
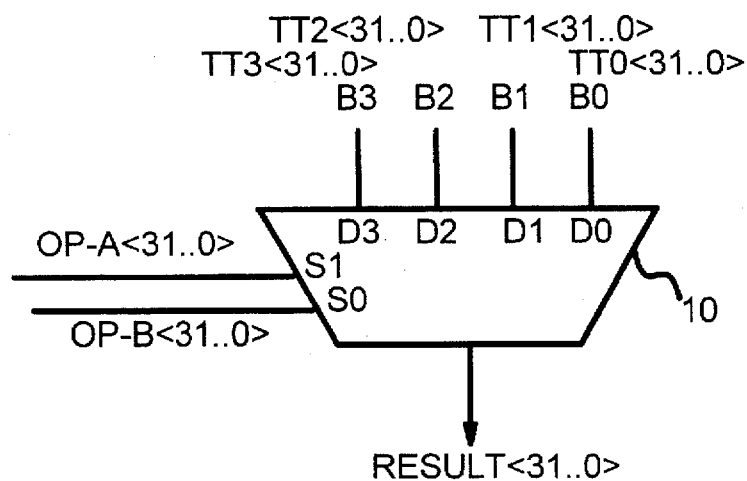
FIG. 1 is a diagram of a vectored mux for performing Boolean logic functions.

FIG. 1 is a diagram of a vectored mux for performing Boolean logic functions.

Vectored mux 10 has 32 individual 4:1 muxes, one generating each bit-position in the 32-bit result. The two input operands, OP-A, OP-B, are applied to the control or select inputs S1, S0 of vectored mux 10. Each of the 32 bits of operand-A is applied to the S1 input of a different 4:1 mux in vectored mux 10, while each bit of operand-B is applied to an S0 input. Thus the individual 4:1 mux which generates bit-position 6 of the result (RESULT<6>), has its S1 select input connected to bit 6 of operand-A (OP-A<6>), while its S0 select input is connected to bit 6 of operand-B (OP-B<6>). Other individual 4:1 muxes in vectored mux 10 are connected in the same fashion. The data inputs D3, D2, D1, D0 of vectored mux 10 are connected to truth-table signals, designated TT3, TT2, TT1, TT0. These truth-table signals are each 32-bits wide, for connecting to the 32 individual 4:1 muxes in vectored mux 10. These truth-table signals are also abbreviated as B3, B2, B1, B0 to indicate a Boolean function may be input.

For a simple Boolean function without any sign-extension, all 32 signals are identical in the truth-table signals applied to one of the data inputs. Thus for AND operations, all 32 bits in TT3<31 . . . 0> are one, while all 32 signals in each of TT2, TT1, and TT0 are zero. Since these bits are the same for all 32 positions, only four bits for any Boolean function need to be stored or generated to drive the data inputs of vectored mux 10. When sign-extension is combined with a Boolean function, then additional bits may need to be stored, as was described in detail in the parent patent, U.S. Pat. No. 5,443,577.

SIGN EXTENSION

Sign-extension can be performed as described in the parent patent by dividing each set of truth-table signals into an upper and a lower section, and modifying the upper section to account for the sign extension. Thus sign-extension is accounted for in the truth-table signals themselves.

Figure 2:
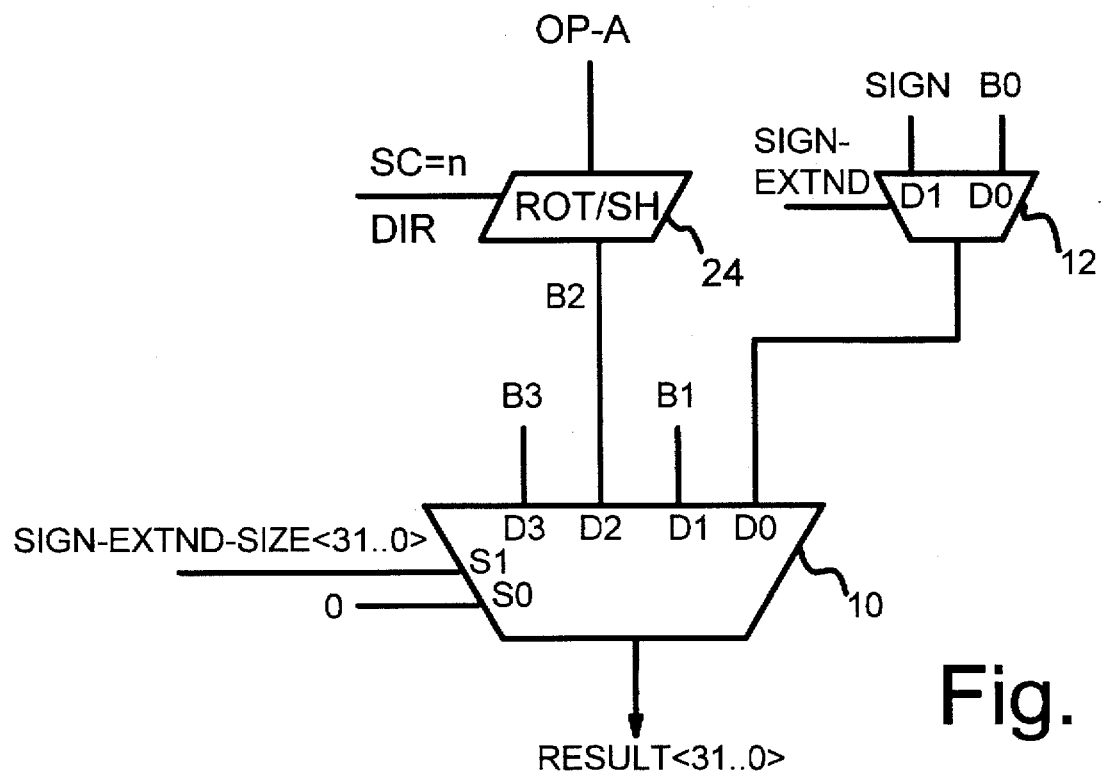
FIG. 2 shows a vectored mux capable of sign-extension of a shifted operand.

FIG. 2 shows a vectored mux capable of sign-extension of a shifted operand. When only one operand is present, such as for simple shift operations, then the method described for FIG. 2 is used to sign-extend or zero-extend the operand. Vectored mux 10 receives operand-A after being shifted or rotated by rotator 24. Data input D2 can receive operand-A with or without a rotate from rotator 24. The shift-count to rotator 24 is simply set to zero when no shift is desired.

Mux 12, a 1-bit-wide mux, receives the sign bit of operand-A, which is typically the most-significant-bit (MSB) of operand-A. The truth-table vector B0 is selected for Boolean operations, but for sign-extension the sign bit is selected instead since signal SIGN-EXTND is high. The sign bit is spread out over all 32 bits of D0. For Boolean operations without sign-extend, just one B0 bit is needed for input to mux 12, and the output of mux 12 is then spread out over all 32 D0 inputs to vectored mux 10. For sign-extension combined with a Boolean operation, two muxes 12 are provided, one having the B0 bit for the lower section and the other having the B0 bit for the upper section. The data inputs to these muxes mat be the same and only their select input are different.

The S0 select control input is driven with a constant zero so that data inputs D1 and D3 are never selected. The S1 input is driven by a vector of the operand size, with one bits where the operand exists and zero bits for the extension part of the 32-bit result. Thus an 8-bit byte operand being extended to 32 bits has the vector 00000000 00000000 00000000 11111111 driven to select input S1. The zero bits select the sign bit from mux 12 and data input D0, while the one bits select the shifted or un-shifted operand-A from data input D2.

Zero-extension is also performed by setting B0 to zero, and negating signal SIGN-EXTND. Extensions of shifted operand-A may require that the operand-size vector applied to S1 indicate where the zero or sign bits need to be merged in. Decoding an operand size and/or shift count into such a vector of zeros and ones is well-known in the art.

RISC ROTATE-MERGE INSTRUCTION

Figure 3:
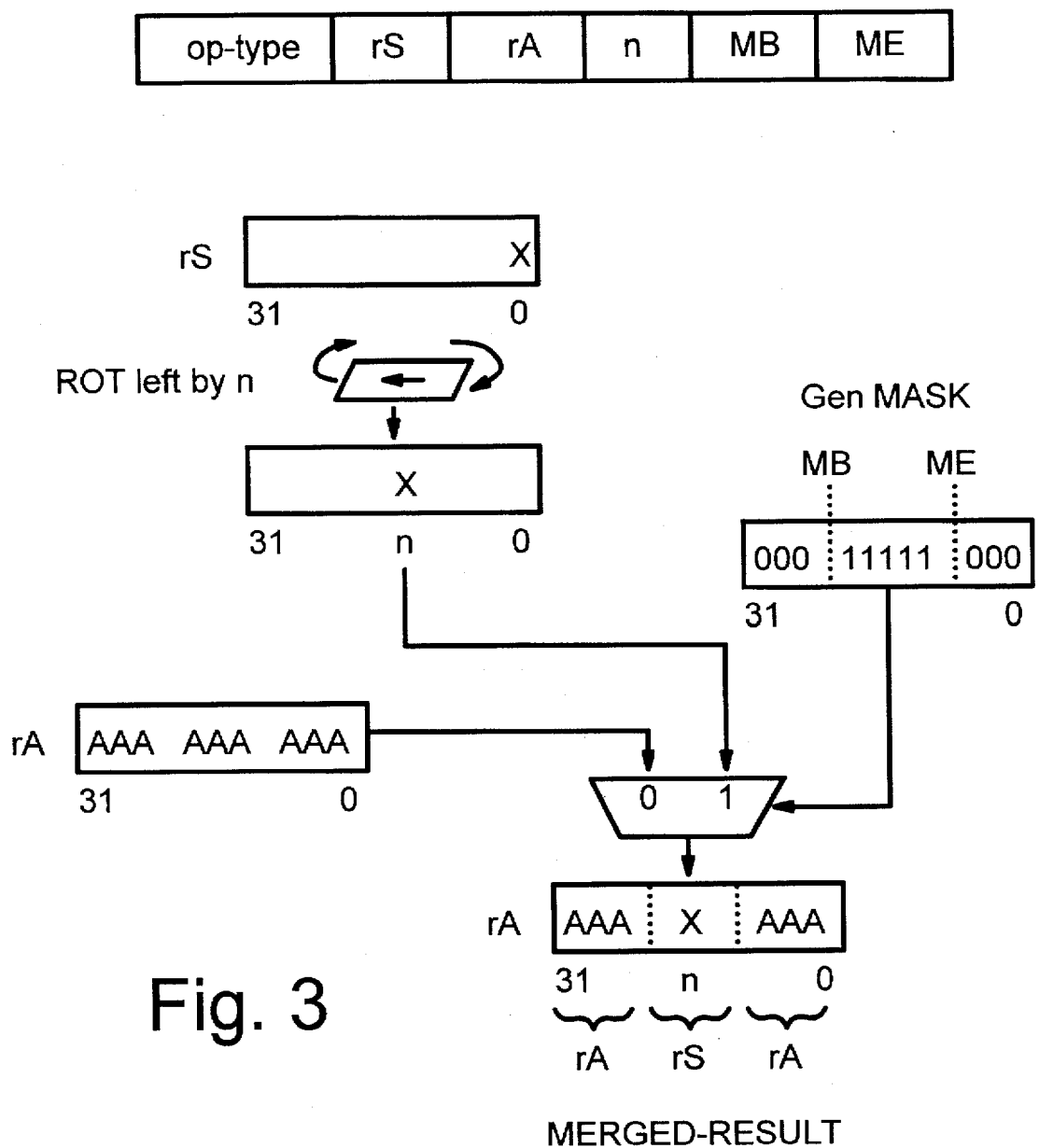
FIG. 3 illustrates the operation performed by a RISC rotate-merge instruction.

FIG. 3 illustrates the operation performed by a RISC rotate-merge instruction. The RISC PowerPC™ architecture provides a wealth of useful instructions, including merge instructions. Merge instructions in their simplest forms may be used to read or test a bit or a field of bits in a register. The bits read can be extracted to a different register where further processing can be performed using the extracted bits. While many forms and variations of these merge operations exist, FIG. 3 highlights one of the more complex of the merge instructions, rlwimi.

The merge instruction rlwimi is the "rotate-left word immediate then mask-insert" instruction. A 32-bit "word" is rotated to the left by the rotate amount "n" which is specified in the instruction word as shown in FIG. 3. Since this rotate amount "n" is contained in the instruction word itself, rather than in a register, the rotate amount is an "immediate" constant. The rotate is performed on a 32-bit source operand from the rS register identified by the rS field in the instruction word. A mask is then generated beginning with the bit identified by field MB and ending with the bit indicted by field ME. The rotated operand is then merged with a second operand in register rA, specified by field rA of the instruction word. The portion of rotated rS between MB and ME is merged into the operand in register rA.

FIG. 3 shows a first operand in register rS having a least-significant-bit (LSB) with the value "X" at bit-position 0. A left rotate by n bits shifts the LSB X over to bit-position n as shown. For a left-rotate the MSB's shifted out from bit-position 31 are rotated back to the LSB. A mask is generated from fields MB, ME by loading a temporary register with ones between MB and ME, but zeros elsewhere. This mask can be used as the control input to a mux which selects the rotated rS operand when the mask for that bit-position is one, but selects the rA register's bit when the mask bit for that bit-position is zero.

Several bits can be extracted from register rS and inserted into register rA using rlwimi. The merge instruction can extract one bit or 32 bits or any number of bits between 1 and 31. Rotating first allows these bits to be placed anywhere in the rA register.

EXECUTING RISC ROTATE-MERGE INSTRUCTION ON A VECTORED MUX

Figure 4:
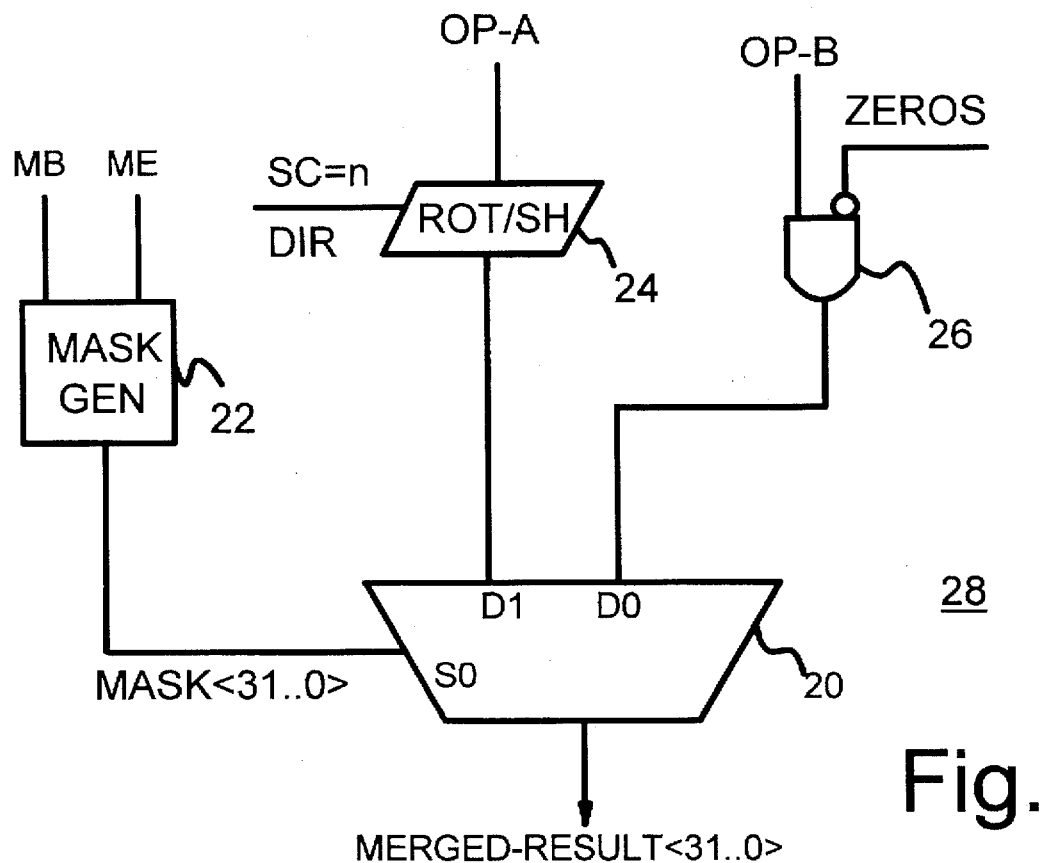
FIG. 4 shows a vectored mux which is modified to execute rotate-merge instructions.

FIG. 4 shows a vectored mux which is modified to execute rotate-merge instructions. Vectored mux 20 is comprised of 32 individual 2:1 muxes, one for each bit-position. Operand-A is first shifted or rotated by rotator 24, which has control inputs determining the number of bits to shift, the shift count (SC) having the value "n", and the direction of the rotate, left or right. The rotated 32-bit output from rotator 24 is received by vectored mux 20 on the D1 data input.

Operand-B is input to vectored mux 20 on its D0 data inputs after an optional zeroing by AND gates 26. For the rlwimi instruction, AND gates 26 simple pass operand-B through. Another rotate-merge instruction, rlwinm, performs an AND with the mask rather than merge the rotated operand-A into operand-B. Any mask bits that are zero, before MB and after ME, cause the result of rlwinm to be zero. Thus operand-B is zeroed out before input to vectored mux 20. Mask generator 22 receives the beginning and ending mask fields MB, ME from the instruction decoder, and generates the mask. Ones are generated for bits between MB and ME, with the other bits being zero. Simple, well-known combinatorial logic may be used to implement mask generator 22. For example, a first mask can be generated using just MB, while a second mask generated using just ME. Simple decoders for each bit-position set the mask bit when the bit-position is greater than MB, or less than ME. The two masks are then ANDed to get the final mask. The generated mask, MASK <31 . . . 0> is input to the select control input of vectored mux 20, with each mask bit controlling an individual 2:1 mux. When the mask bit is high for a bit-position, D1 is selected and rotated operand-A is selected as the result output. When the mask bit is low for a bit-position, operand-B is selected as the result output (or zeros from AND gates 26 for rlwinm).

Vectored mux 20, mask generator 22, rotator 24, and AND gates 26 together form merge unit 28 for performing merge and rotate operations.

SEPARATE MERGE AND BOOLEAN UNITS

Figure 5:
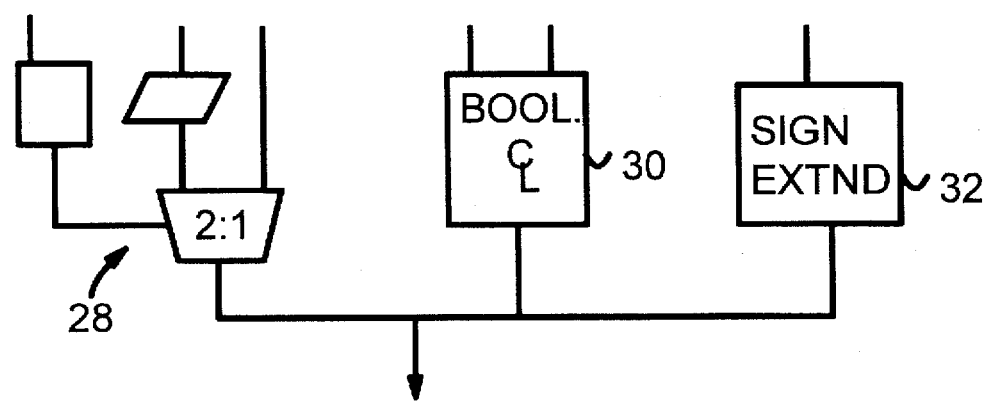
FIG. 5 is an embodiment of an ALU using separate Boolean and merge units.

FIG. 5 is an embodiment of an ALU using separate Boolean and merge units. Merge unit 28 described for FIG. 4 receives operands A and B and generates a result, as does Boolean unit 30. Sign extender 32 may also be needed, and it may be located in parallel as shown, or on the inputs to Boolean unit 30 or merge unit 28. An adder and a multiplier also receive operands A and B and generate a result for the ALU, but are not shown.

Boolean unit 30 may be constructed from random combinatorial logic, or from the vectored 4:1 mux as described herein. Merge unit 28 is also constructed from a separate 2:1 mux.

BOOLEAN VECTORED MUX USED FOR MERGE OPERATIONS

The inventor has realized that the merge unit and the Boolean unit can be combined. The 4:1 mux for the Boolean unit can be controlled as a 2:1 mux to perform merge operations. Thus the same hardware mux can be used for two functions, reducing cost and complexity. Since both of these muxes are vectored muxes, reducing the number of vectored muxes also reduces complexity for mux control logic.

A 4:1 mux may be logically reduced to a 2:1 mux by applying a constant to one of the two select inputs. When a constant zero is applied to the S0 input, data inputs D1 and D3 are never selected. Data input D0 is selected when S1 is low, while data input D2 is selected when S1 is high. The 4:1 vectored mux, useful for performing Boolean operations, can also be used as a 2:1 mux for merge operations.

Another major difference between the vectored 4:1 mux for Boolean operations and the 2:1 mux for merge operations is that the operands are input to the select control inputs for Boolean operations, but to the data inputs for merge operations. Additional control logic is needed to route the operands to the control inputs for Boolean operations but to the data inputs for merge and rotate operations. The mask and a constant must be routed to the select control inputs for merge operations.

COMBINED BOOLEAN AND MERGE UNIT USING VECTORED MUX

Figure 6:
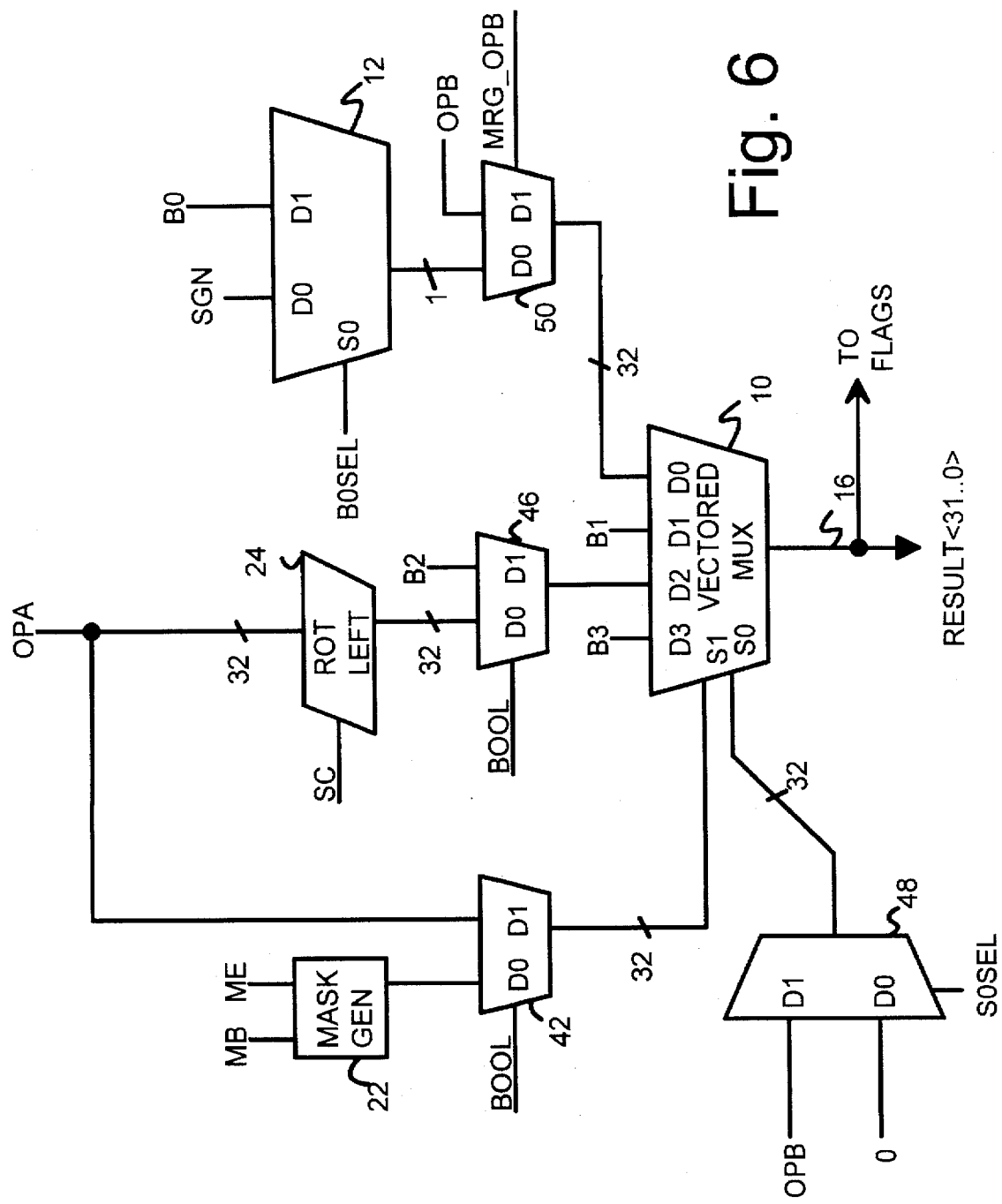
FIG. 6 shows an execute unit with a vectored mux for executing Boolean logic operations and rotate and merge operations.

FIG. 6 shows an execute unit with a vectored mux for executing Boolean logic operations and rotate and merge operations. Vectored mux 10 is comprised of 32 individual 4:1 multiplexers or muxes as described for FIG. 1. When truth table inputs B3, B2, B1, B0 are coupled to the data inputs D3, D2, D1, D0 and operands A and B are coupled to the select control inputs S1, S0 of vectored mux 10, then the Boolean function encoded in the current truth-table signals is performed on operands A and B. Other Boolean functions are performed simply by applying a different set of truth-table signals to B3:B0, as described in detail in the parent U.S. Pat. No. 5,442,577, where tables 1–4 showed truth-table signals for various Boolean functions such as AND, OR, XOR, A ANDNOT B.

For Boolean operations, signal BOOL is high, causing mux 46 to select vector B2 while mux 42 couples operand-A to the S1 control input of vectored mux 10. SOSEL is set high to connect operand-B to the S0 control input of vectored mux 10. Truth-table vector B0 is connected to data input D0 through muxes 12, 50 by setting BOSEL high and MRG_OPB low. Thus vectored mux 10 is connected properly for Boolean operations.

The instruction decoder at the beginning of the pipeline decodes the instruction's opcode to determine what type of operation is called for. Boolean operations are further decoded into the exact Boolean operation just before the pipestage containing the ALU, although may variations of the decoding are possible. The Boolean operation decoded then selects the correct set of truth-table vectors to apply to B3:B0. For Boolean operations without a sign-extend, a single bit for each of the four truth-table vectors is generated and spread out over all 32 bits. Boolean operations with a sign extended-operand require two bits for each vector, one for the lower section and a second for the upper section, as was described in the parent patent in Tables 5–9. The four or eight truth-table bits may be read from a small ROM or generated by a programmable-logic array (PLA) or other decoding logic.

For merge operations, the connection of the operands to the vectored mux is reversed. Instead of applying the operands to the select control inputs as for Boolean operations, the operands are applied to the data inputs. When two operands are used, operand-B is applied to data input D0 through mux 50, which has MRG_OPB set high. Operand-A is applied to data input D2 through mux 46, which has BOOL set low for merge operations. Operand-A is first rotated or shifted by rotator 24 before being input to mux 46 and vectored mux 10.

Rotator 24 is preferably a simple barrel rotator, allowing a rotate of any number of bits to be performed in a single step. The number of bit-positions rotated is determined by the shift count SC, which can be read from a register or as an immediate value in the instruction itself. The direction of the shift or rotate, either left or right, is also determined by the instruction and input to rotator 24 as is the type of operation, either a shift or a rotate (not shown). The type and direction of shift/rotate is usually determined by the opcode itself. A rotate is a shift with the MSB looped back to the LSB for a left rotate, or the LSB looped back to the MSB for a right rotate. Shifts do not loop the MSB or LSB back, but simply drop bits that are shifted off the end. Zeros are shifted in the other end, except for arithmetic right shifts, which shift in the sign bit, which is the original MSB. An alternate embodiment described later uses a simple rotator with the masking and merging features of the vectored mux to accomplish both rotates and shifts.

For simple rotate or shift operations, vectored mux 10 just passes the rotated operand-A through to the result. Data input D2 from rotator 24 is selected by forcing S1, S0 to 10 in all bit-positions. Mask generator 22 defaults to output 32 bits of ones when no mask operation is being performed. BOOL is low for non-Boolean operations, coupling the one outputs from mask generator 22 to S1 control input through mux 42. SOSEL is also set low, causing mux 48 to select a zero to S0. For more complex instructions, the rotated operand-A can then be merged or masked using vectored mux 10. Simple mask and merge operations can also be performed by setting the shift count to zero for rotator 24.

Mask generator 22 receives the beginning and ending bit-positions of the mask or merge, MB, ME, which can each be encoded by 5-bit fields in the instruction word. Mask generator 22 generates a 32-bit mask which has ones between MB and ME, but zeros elsewhere. This mask is selected by mux 42 when BOOL is low, and applied to select input S1 of vectored mux 10. The other select input, S0, is driven by 32 zeros from mux 48 as signal SOSEL is low. Thus data inputs D3 and D1 cannot be selected as S0 is low for all 32 bits. Vectored mux 10 is logically reduced from a 4:1 mux to a 2:1 mux for merge operations.

SC, MB, and ME can be provided from decoding or control logic based on the type of instruction or can be provided directly in the instruction word. For example, a sign-extended byte instruction would set SC=0, MB=7, ME=0, thus merging bits 31 to 8 of its operand with a sign bit, if selected.

For the bit positions between MB and ME, in the masked portion, a one is output to select input S1, and thus data input D2 is selected. However, for bit positions outside of the masked portion, a zero is output to S1, and data input D0 is selected. D2 receives the rotated operand-A, while D0 receives operand-B through mux 50, which has MRG_OPB set for two-operand merge operations. Thus operand-A, possibly rotated by rotator 24, is merged into operand-B using vectored mux 10. The mask determines which bits of the result originate from each operand.

A simple mask or merge occurs when the shift count SC is set to zero, while a rotate-merge (rlwimi) or a shift-merge operation occurs when SC is non-zero. A mask operation differs from a merge in that only one operand is used for a mask, but two for a merge. For a mask operation, bit-positions not between MB and ME are cleared to zero. Thus a mask operation is simply a merge with a zero-filled register.

Mask operations are performed by applying 32 zeros to data input D0 rather than applying the second operand-B. MRG_OPB is set low for mask operations, while BOSEL is set high, causing truth-table vector B0 to be applied to data input D0 through muxes 12, 50. Bit B0 is set to zero, which is spread to all 32 bits for the mask operation. Thus zeros are merged with operand-A when a mask operation such as rlwinm is performed.

An explicit sign-extension operation is performed on a single operand, operand-A, by applying operand-A, possibly after a rotate by rotator 24, to data input D2 through mux 46 has signal BOOL low. Mask generator 22 generates a vector for the operand size as described for FIG. 2, with one bits where the operand-A has significant bits, but zero bits where extension is to occur. This operand-size vector is applied to select control input S1. Signal SOSEL is low, forcing a constant zero onto select input S0 so that only data inputs D0 or D2 can be selected.

Signal MRG_OPB is low since a second operand is not being merged in. Mux 50 couples the output from mux 12 to data input D0 of vectored mux 10. For sign-extension, signal BOSEL is low, selecting the sign bit, the MSB of operand-A, to data input D0 of vectored mux 10. Zero-extension is performed by setting truth-table signal B0 to zero, and BOSEL high, so that zeros are applied to data input D0 of vectored mux 10.

The S1 input is driven by a vector of the operand size, with one bits where the operand exists and zero bits for the extension part of the 32-bit result. Thus an 8-bit byte operand being extended to 32 bits has the vector 00000000 00000000 00000000 11111111 driven to select input S1. The zero bits select the sign bit from mux 12 and data input D0, while the one bits select the shifted or un-shifted operand-A from data input D2. Thus sign-extension is performed by merging the operand with the sign bits using vectored mux 10 to perform the merge.

Result output 16 from vectored mux 10 can be used to generate flags for the ALU result. For example, comparing result output 16 to zero generates the 'Z' flag.

SIMPLIFIED EMBODIMENT OF ROTATOR FOR SHIFT OPERATIONS

For an arithmetic shift right instruction, sign-extension is required. Vectored mux 10 and mask generator 22 are used to perform an arithmetic shift by adjusting the rotated output from rotator 24. The instruction decoder sets shift count SC to n, the number of bits to shift. MB is set to 0, while ME is set to 31–n. The sign bit is selected by mux 12 for the merge rather than zeros. Vectored mux 10 merges the sign bit from mux 12 to the MSB's of the result above ME. Rotator 24 simply rotates by the shift count SC, even for shift operations. Thus rotator 24 can be used for both rotates and shifts by always rotating in rotator 24, but using the merge/mask features of vectored mux 10 to generate the shift result from the rotated output.

The direction control for rotator 24 can also be eliminated by adjusting shift count SC. Rotator 24 is designed to always rotate left. For right rotates and shifts, the shift count SC is simply complemented in modulo 32. Thus a right shift by 2 bit-positions is complemented to a left shift by 30 bit positions. Of course, rotator 24 could default to either right or left shifts/rotates, and the modulus can be changed for different data-path widths.

A shift left by a shift of "n" is thus accomplished by setting:
SC=n
MB=0
ME=n
Merge with zeros.
A shift right by a shift of "n" is accomplished by setting:
SC=two's complement of n
MB=31–n
ME=0
Merge with zeros for logical shift, but merge with sign bit for arithmetic shift.

Thus the mask/merge features of vectored mux 10 and surrounding logic can be used to adjust the output from a simplified rotator 24 which can only rotate in one direction. This reduces cost and complexity as a simpler rotator is used rather than a more versatile and complex bi-directional rotator/shifter.

ADVANTAGES

The invention provides a versatile yet simple apparatus for executing a wide variety of operations: Boolean logic, merge, mask, rotate, shifts, sign-extension, and zero-extension and combinations thereof. Often separate units are provided for each of these operations. The invention provides a single unit for performing all of these operations.

The vectored mux can execute any arbitrary Boolean logic function merely by placing a different set of truth-table vectors to the data inputs. Thus special logic is not needed for each type of Boolean operation. Many types of Boolean operations can be supported with minimal design effort.

The same vectored mux is used for merge and mask operations. Using the same hardware for two purposes is an efficient use of limited silicon resources. The rotator is coupled to the vectored mux so that shifts and rotates can be sent through the vectored mux too. This allows compound operations such as rotate-merge operations to be performed in a single step.

Compound operations can be performed in a single step, such as a single clock cycle. Rotates and shifts can occur before a merge, mask, sign or zero-extension operation. Sign-extension can be combined with a Boolean operation by altering the truth-table vectors.

The invention provides a very streamlined and efficient execution unit for the many miscellaneous instructions that must be processed. When combined with an adder and a multiplier and divider, a complete set of integer ALU instructions can be executed.

ALTERNATE EMBODIMENTS

Several other embodiments are contemplated by the inventor. For example the invention has been described for 32-bit operations, but smaller or larger widths may be used, such as with advanced 64-bit processors. More complex or simple mask schemes may be used for the mask and merge operations by altering the mask generator. The vectored mux may be modified to have more or fewer data or control inputs, and the order of the inputs may also be modified.

While the more complex operations such as compound rotate-merge operations have been described to show the features and capabilities of the vectored mux, many simpler instructions can also be executed by the apparatus. A more complex rotator can have additional features to insert the sign bit or zero bits to perform arithmetic and logical shifts rather than use the mask/merge features of the invention. A simple shifter rather than a simple rotator may also be substituted.

Many variations of the control logic are possible. The various muxes may be combined. For example, Muxes 10 and 12 may be combined into one larger mux. Muxes may also be combined with other hardware such as the mask generator being combined with mux 42. Generation of shift count SC and mask endpoints MB, ME may be generated in many different ways from the instruction itself or registers.

A shift overflow can be defined when the shift count SC is greater than or equal to 32. All the data is shifted out in a shift overflow. The mask is forced to all zeros and outputted as the result when a shift overflow occurs.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A logic-instruction execution unit for executing Boolean operations and merge operations, the logic-instruction execution unit comprising:

a vectored mux for outputting a result of a Boolean operation or a merge operation, the vectored mux comprising a plurality of individual mux cells, each mux cell having data inputs and select control inputs and an output driving one bit-position of the result, the select control input controlling which data input is coupled to drive the output independently of other data inputs;

a first operand input comprising a plurality of electrical signals representing a first operand;

a second operand input comprising a plurality of electrical signals representing a second operand;

Boolean control means for applying the first operand input and the second operand input to the select control inputs of the vectored mux when a Boolean operation is executed;

truth-table inputs comprising electrical signals representing a truth table for the Boolean operation, the truth-table inputs varying for different Boolean operations;

the Boolean control means including means for applying the truth-table inputs to the data inputs of the vectored mux when a Boolean operation is executed;

merge control means for applying the first operand inputs to a first data input on the vectored mux and for applying the second operand inputs to a second data input on the vectored mux when a merge operation is executed;

a mask generator for generating a mask indicating a first portion of the result from the first operand and a second portion of the result from the second operand, the first portion and the second portion not overlapping;

the merge control means including means for applying the mask to a select control input of the vectored mux when a merge operation is executed, wherein the mask causes the vectored mux to select the first portion of the first operand applied to the first data input and the second portion of the second operand applied to the second data input, whereby the vectored mux executes both merge operations and Boolean operations, the operands applied to the data inputs for merge operations but applied to the select control inputs for Boolean operations.

2. The logic-instruction execution unit of claim 1 for further executing mask operations, the logic-instruction execution unit further comprising:

zeroing means for forcing the second operand to signals representing all zeros when a mask operation is executed;

the merge control means applying the second operand being all zeros to the second data input but applying the first operand to the first data input and the mask to the select control input when a mask operation is executed;

wherein the second portion of the result comprises all zeros but the first portion is the first portion from the first operand when a mask operation is executed, whereby mask, merge, and Boolean operations are all executed by the vectored mux.

3. The logic-instruction execution unit of claim 2 wherein the mask generator receives mask limits, the mask limits determining an extent of the first and second portions in the result.

4. The logic-instruction execution unit of claim 2 wherein the vectored mux is comprised of individual four-to-one mux cells each having four data inputs and two select control inputs;

the merge control means further comprising:

constant means for applying a constant electrical signal to one of the select control inputs when a mask or a merge operation is executed, the constant electrical signal preventing two of the four data inputs from being selected while allowing only the first and the second data inputs to be selected for mask and merge operations, whereby the vectored mux uses four data inputs for Boolean operations of two operands but only two data inputs for mask and merge operations.

5. The logic-instruction execution unit of claim 4 further comprising:

rotate means, receiving the first operand input, for rotating the first operand by a shift-count number of bit-positions and outputting a rotated first operand to the first data input of the vectored mux when a rotate operation is executed;

the merge control means applying the mask having a constant value when a simple rotate operation is executed, the constant value causing the rotated first operand to be selected to drive the output of the vectored mux as the result, whereby rotate operations are also performed by the logic-instruction execution unit and rotate results are passed through the vectored mux.

6. The logic-instruction execution unit of claim 5 wherein when a shift operation is performed:

the mask generator includes means for generating a shift mask indicating a first portion of the rotated first operand, the first portion having a size equal to the shift count, the shift mask also indicating a second portion not overlapping the first portion;

the merge control means includes means for applying the shift mask to the select control input of the vectored mux;

wherein the first portion of the shift mask causes the vectored mux to select the rotated first operand to drive the output of the vectored mux as a first portion of the result, but the second portion of the shift mask causes the vectored mux to select the second operand forced to signals representing all zeros to drive the output of the vectored mux as a second portion of the result, wherein shift operations are executed as a type of rotate operation using the rotate means and the vectored mux.

7. The logic-instruction execution unit of claim 6 wherein the rotate means comprise a barrel shifter/rotator.

8. The logic-instruction execution unit of claim 6 wherein the rotate means is disabled for simple merge operations by applying a shift-count of zero to the rotate means.

9. The logic-instruction execution unit of claim 5 further comprising:

sign-bit means for generating as the second operand a vector of the sign bit replicated to all bit positions in the second operand;

wherein when an arithmetic shift operation is performed:

the mask generator includes means for generating a shift mask indicating a first portion of the rotated first operand, the first portion having a size equal to the shift count, the shift mask also indicating a second portion not overlapping the first portion;

the merge control means includes means for applying the shift mask to the select control input of the vectored mux;

wherein the first portion of the shift mask causes the vectored mux to select the rotated first operand to drive the output of the vectored mux as a first portion of the result, but the second portion of the shift mask causes the vectored mux to select the second operand forced to signals representing the sign bit to drive the output of the vectored mux as a second portion of the result, wherein arithmetic shift operations are executed as a type of rotate operation using the rotate means and the vectored mux with the sign bit extended and driven as the second operand.

10. The logic-instruction execution unit of claim 5 for further executing compound shift-merge operations and rotate-merge operations in a single step, the merge control means applying the rotated first operand to the first data input and applying the mask to the select control input when the compound shift-merge operation is executed.

11. The logic-instruction execution unit of claim 10 wherein the compound shift-merge operation is a RISC rotate-left word immediate then mask-insert rlwimi instruction.

12. A method of executing Boolean logic operations in a logical unit of a central processing unit (CPU), the logical unit having a vectored mux, the method comprising the steps of:

determining which Boolean logic operation is encoded in an instruction opcode;

selecting a set of truth-table signals representing the Boolean logic operation encoded by the instruction opcode;

applying the set of truth-table signals to data inputs of the vectored mux;

applying a first operand to a first select control input to the vectored mux;

when the Boolean operation is an operation with two input operands, applying a second operand to a second select control input to the vectored mux;

for each bit-position in a result, selecting one of the data inputs for output as the result for the bit-position under control of corresponding bit-positions of the first and second operands input to the select control inputs of the vectored mux, whereby Boolean logic operations are executed by the vectored mux.

13. The method of claim 12 further for executing a compound rotate-merge operation in the vectored mux for executing Boolean logic operations, the method further comprising the steps of:

rotating the first operand by a shift amount of bit-positions and outputting a rotated first operand;

applying the rotated first operand to the first data input of the vectored mux;

applying the second operand to the second data input of the vectored mux;

generating a mask vector represented by electrical signals;

applying the mask vector to a select control input of the vectored mux;

selecting bit-positions of the rotated first operand from the first data input of the vectored mux when a corresponding bit-position in the mask vector is in a first state, but selecting bit-positions of the second operand from the second data input when the corresponding bit-position in the mask vector is not in the first state;

outputting from the vectored mux as the result of the compound rotate-merge operation selected bit-positions from the rotated first operand and the second operand, whereby both Boolean operations and the compound rotate-merge operation are executed on the vectored mux.

14. The method of claim 13 wherein the Boolean operation is executed in a single clock cycle through the vectored mux and wherein the compound rotate-merge operation is executed in a single clock cycle through the vectored mux.

15. An arithmetic-logic-unit (ALU) for executing integer instructions in a central processing unit (CPU), the ALU comprising:

a first operand input;

a second operand input;

a result output;

an adder for performing add and subtract operations on the first and second operand inputs, the adder outputting a sum as the result output;

a Boolean-logic unit for performing Boolean, merge, rotate, and shift operations, the Boolean-logic unit comprising:

a vectored mux having a plurality of multiplexer cells each having data inputs, a first select input and a second select input, and output for outputting one bit-position of the result output, each multiplexer cell selecting one of the data inputs as the result output in response to the first and second select inputs;

truth-table means for applying electrical signals representing a truth-table of a Boolean-logic function being executed to the data inputs of the vectored mux;

first select means for applying the second operand input to the first select inputs of the vectored mux when a Boolean operation is being executed, but applying a constant signal to the first select inputs when a Boolean operation is not being executed;

mask generator means for generating a mask indicating which bit-positions of the first operand input are output to the result and which bit-positions of the first operand input are not output to the result;

second select means for applying the first operand input to the second select inputs of the vectored mux when a Boolean operation is being executed, but applying the mask to the second select inputs when a Boolean operation is not being executed;

a shifter for shifting and rotating the first operand input to produce a shifted first operand when a rotate or shift operation is being executed;

first data select means, coupled to the shifter and the truth-table means, for outputting one of the truth-table signals to a data input of the vectored mux but for outputting the shifted first operand to a data input of the vectored mux when a Boolean operation is not being executed;

second data select means, coupled to the second operand input and the truth-table means, for outputting a second one of the truth-table signals to a second data input of the vectored mux but for outputting the second operand input to the second data input of the vectored mux when a Boolean operation is not being executed;

whereby the Boolean-logic unit executes Boolean-logic operations and merge, rotate, and shift operations.

16. The ALU of claim 15 wherein the Boolean, merge, rotate, and shift operations are performed in a single clock cycle.

17. The ALU of claim 15 further for executing mask operations, the ALU further comprising:

mask select means, coupled to the vectored mux, for applying a constant set of signals all representing zero to the second data input of the vectored mux when a mask operation is executed, whereby mask operations are executed by the vectored mux in the Boolean-logic unit.

18. The ALU of claim 15 further for executing sign-extend operations, the ALU further comprising:

a sign bit for the first operand input, the sign bit indicating when the first operand input represents a binary number less than zero;

sign coupling means for applying the sign bit to the second data input of the vectored mux when a sign-extension operation is being executed, whereby sign-extension operations are executed by the Boolean-logic unit.

* * * * *